United States Patent [19]

Hayashi et al.

[11] Patent Number: 5,305,241
[45] Date of Patent: Apr. 19, 1994

[54] ERROR CORRECTING APPARATUS IN POSITION DETECTION

[75] Inventors: Yasukazu Hayashi; Shinji Shibata, both of Niwa, Japan

[73] Assignee: Okuma Corporation, Aichi, Japan

[21] Appl. No.: 757,462

[22] Filed: Sep. 10, 1991

[30] Foreign Application Priority Data

Sep. 17, 1990 [JP] Japan .................. 2-246834

[51] Int. Cl.$^5$ .............................. G06F 15/46
[52] U.S. Cl. ..................... 364/576; 364/559; 364/560; 364/571.04
[58] Field of Search ...... 364/571.01, 571.04, 364/571.07, 565, 576, 559, 560, 561, 562, 167.01; 356/375

[56] References Cited

U.S. PATENT DOCUMENTS

| | | | |
|---|---|---|---|
| 4,587,622 | 5/1986 | Herzog | 364/571.04 X |
| 4,879,671 | 11/1989 | Rieder et al. | 364/571.01 X |
| 4,947,095 | 8/1990 | Kawamura et al. | 364/571.01 X |
| 5,138,564 | 8/1992 | de Jong et al. | 364/571.01 X |
| 5,142,412 | 8/1992 | Deschamps et al. | 364/565 X |
| 5,155,696 | 10/1992 | Shibata et al. | 364/571.01 |
| 5,202,842 | 4/1993 | Suzuki | 364/571.01 |

FOREIGN PATENT DOCUMENTS 8909926 10/1989 World Int. Prop. O. ...... 364/571.01

Primary Examiner—Kevin J. Teska
Attorney, Agent, or Firm—Wenderoth, Lind & Ponack

[57] ABSTRACT

Position detection data having large sized data quantities are arranged into small-sized data by converting the data into several periodic components using Fourier series expansion. Therefore, regardless of the resolution of a position detector, the position detector error data can be stored in a small-sized non-volatile memory having a small capacity. Further, since noise does not have a periodic property, it is possible to remove or omit the noise component yielded in the measurement by a filter effect when the Fourier expansion is carried out.

3 Claims, 8 Drawing Sheets

| | E[$X0] | E[$X1] | E[$X2] | | E[$XD] | E[$XE] | E[$XF] |
|---|---|---|---|---|---|---|---|
| E[$0X] | 3 | 9 | 13 | | -11 | -10 | -6 |
| E[$1X] | -1 | 5 | 9 | | -10 | -8 | -4 |
| E[$2X] | 3 | 9 | 14 | | -5 | -4 | 0 |
| E[$3X] | 6 | 12 | 15 | | -10 | -9 | -5 |
| E[$4X] | 1 | 7 | 11 | | -14 | -13 | -9 |
| E[$5X] | -4 | 2 | 6 | | -13 | -11 | -7 |
| E[$6X] | 0 | 7 | 11 | | -7 | -6 | -2 |
| E[$7X] | 4 | 9 | 13 | | -12 | -11 | -7 |
| E[$8X] | -1 | 5 | 9 | | -16 | -15 | -12 |
| E[$9X] | -6 | 0 | 4 | | -16 | -14 | -9 |
| E[$AX] | -3 | 4 | 8 | | -10 | -9 | -5 |
| E[$BX] | 1 | 6 | 10 | | -14 | -13 | -9 |
| E[$CX] | -3 | 3 | 7 | | -17 | -16 | -12 |
| E[$DX] | -6 | 0 | 4 | | -13 | -11 | -7 |
| E[$EX] | 0 | 7 | 11 | | -5 | -4 | 0 |
| E[$FX] | 6 | 12 | 16 | | -8 | -7 | -3 |

FIG. 3

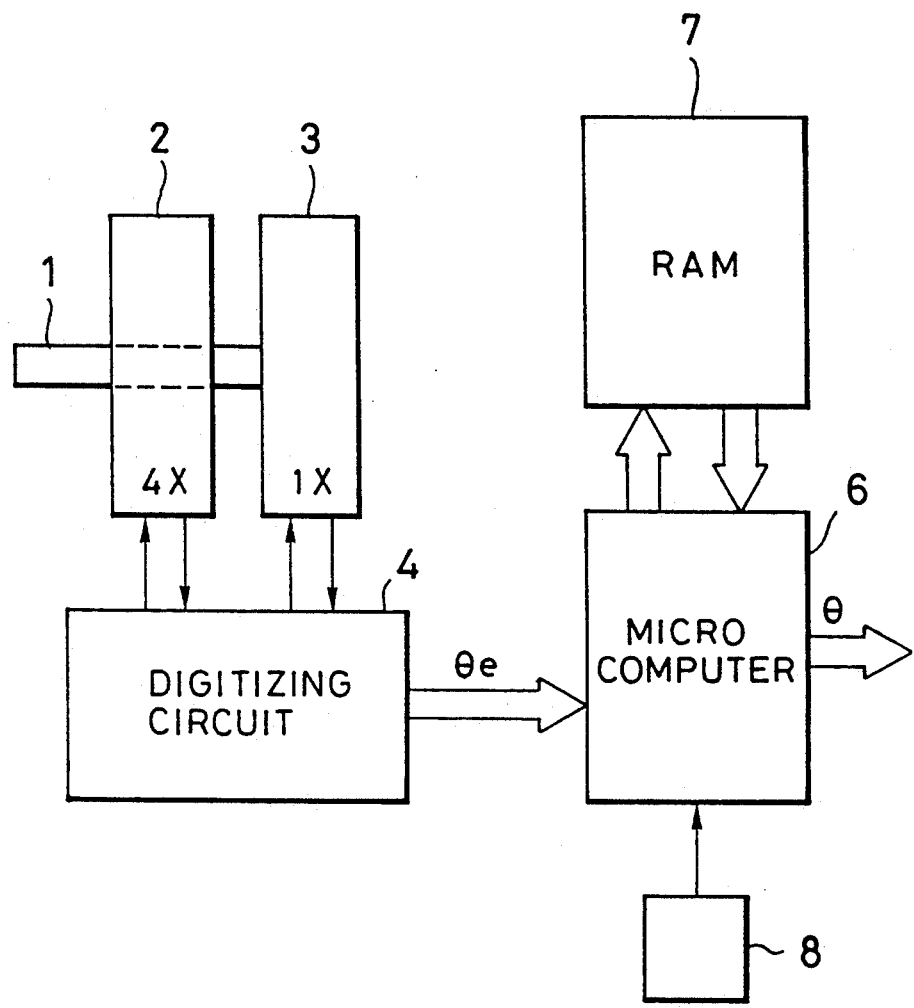
F I G . 4

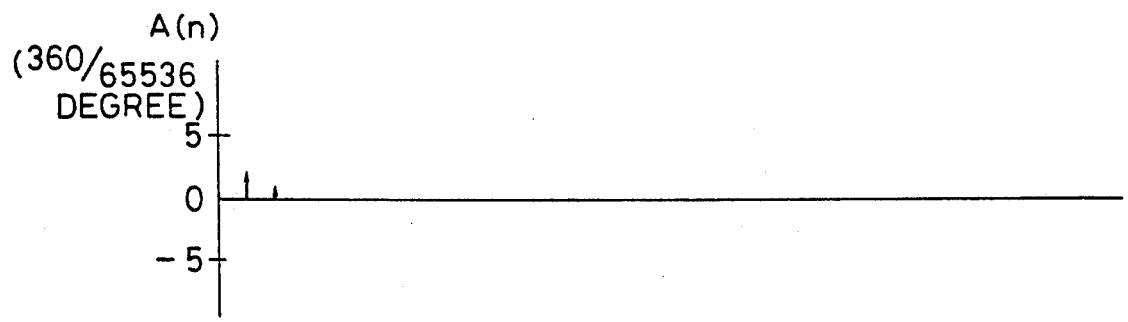
FIG. 5A
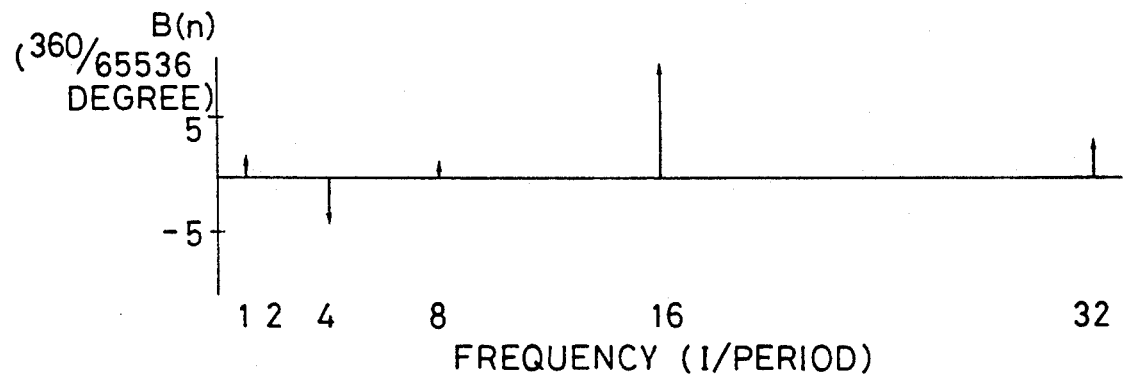
FIG. 5B
| I | T(I) | C(I) | S(I) |
|---|------|------|------|
| 0 | 1 | 2 | 2 |
| 1 | 1/2 | 1 | 0 |
| 2 | 1/4 | 0 | -4 |
| 3 | 1/8 | 0 | 1 |
| 4 | 1/16 | 0 | 10 |
| 5 | 1/32 | 0 | 3 |
| 6 | 0 | 0 | 0 |
FIG. 6

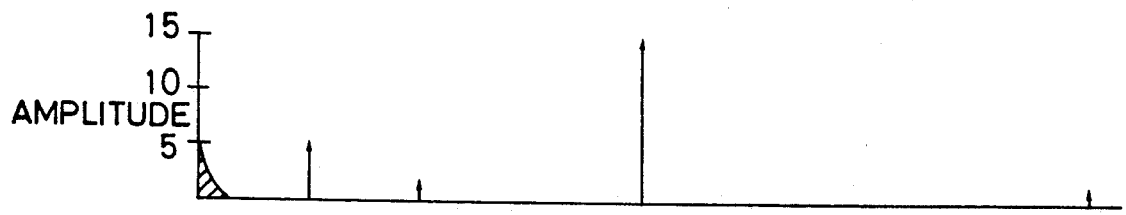
FIG. 9A
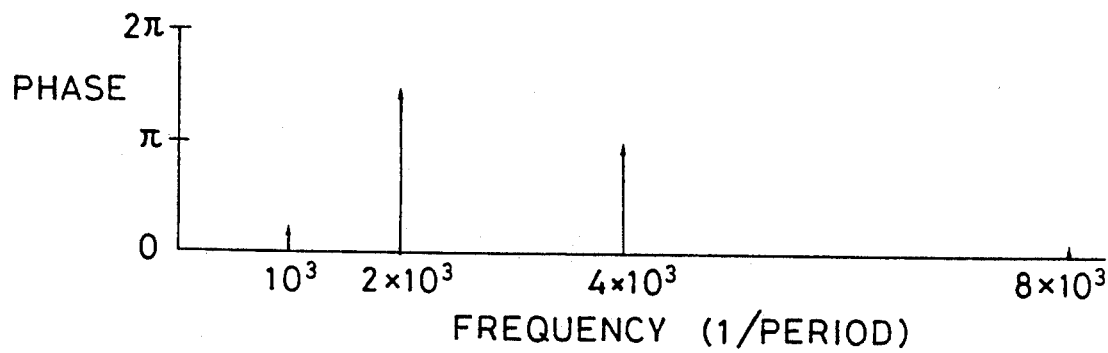
FIG. 9B
| I (PERIOD) | G(I) | PH(I) |
|---|---|---|
| 1 (1/1000) | 5 | $\frac{1}{4}\pi$ |
| 2 (1/2000) | 2 | $\frac{3}{2}\pi$ |
| 3 (1/3000) | 0 | 0 |
| 4 (1/4000) | 15 | $\pi$ |
| 5 (1/5000) | 0 | 0 |
| 6 (1/6000) | 0 | 0 |
| 7 (1/7000) | 0 | 0 |
| 8 (1/8000) | 1 | 0 |
FIG. 10

ERROR CORRECTING APPARATUS IN POSITION DETECTION

BACKGROUND OF THE INVENTION

The present invention relates to an error correcting apparatus in position detection, which is installed in a position detector for detecting a position on a linear position or a rotational position.

FIG. 1 is a block diagram showing a conventional position detector and error correcting apparatus in position detection. FIG. 2 is a graph showing position detection errors in the position detector shown in FIG. 1.

In FIG. 1, there is provided an one-revolution absolute position detector comprising an input shaft 1, a 4×-resolver 2, a 1×-resolver 3 and a digitizing circuit 4. This position detector enables the 4×-resolver 2 to perform an absolute detection with a high resolution up to one-fourth revolution around the input shaft 1. Further, this position detector allows the 1×-resolver 3 to revise the position detection data detected by the 4×-resolver 2 to data which indicate an absolute position within one revolution around the input shaft 1. With this arrangement, the position detector shown in FIG. 1 detects a rotational position in one revolution of the input shaft 1 with a resolution up to 1/65536 revolution.

On the other hand, a PROM (programmable ROM) 5 holds, or is written in with, data obtained from the measurement which has in advance performed every 1/256 revolution as to the position detection errors (the graph shown in FIG. 2) within one revolution in the position detector as shown in FIG. 3. The detected rotational position data are outputted as numeral data $\theta_e$ through the digitizing circuit 4 onto a microcomputer 6, which, in turn, based on the detected value $\theta_e$ from the digitizing circuit 4, reads out from the PROM 5 the data on the position detection errors before and after the detected value. Then, the microcomputer 6 subjects the read-out data to interpolation operation as shown in a formula (1) to determine the measurement error e of the detected value $\theta_e$, and using a formula (2), calculates and outputs rotational position data $\theta$ free from the error.

$$e = E[\theta_e/256] + (E[\theta_e/256+1] - E[\theta_e/256]) \times (\theta_e \text{ MOD } 256)/256 \quad (1)$$

$$\theta = \theta_e - e \quad (2)$$

In the conventional error correcting apparatus in position detection described above, in the case where a precision measurement is required using a position detector with high resolution, the less the error in the interpolation operation becomes, the more the error in the position detection increases. As a result, to deal with such a case, it is necessary to provide a non-volatile memory having a large capacity in order to store the data on position detecting errors. This requires, however, a PROM which is unable to be revised after writing and a high cost large capacity EEPROM (electrically erasable PROM), and further gives rise to a difficulty in that the devices are too large to be incorporated. Moreover, the measured data on position detecting error are liable to be mixed with noises during the measurement, an therefore performing a correction based on the data disadvantageously causes errors in accordance with the mixed noises to the corrected position detection values.

SUMMARY OF THE INVENTION

The present invention has been accomplished in view of the above, and an object of the present invention is to provide an error correcting apparatus in position detection having a low cost and small size, and which can measure with a high precision.

According to one aspect of the present invention, for achieving the objects described above, there is provided an error correcting apparatus in position detection for correcting a position detection error in a position detector. The error correcting apparatus includes a non-volatile memory for storing in advance, each Fourier periodic component of said position detection error, which is obtained by transforming said position detection error to Fourier series having basic periods of integer multiplications of an absolute position detection range of said position detector; a converting means for operating an inverse Fourier transform by reading out each periodic component of said position detection error from said non-volatile memory when a system is activated; a random access memory for storing the position detection error converted by said converting means; and a correcting means for reading out of said random access memory said position detection error corresponding to position detection value from said position detection so as to correct said position detection value.

These and other objects, features and advantages of the invention will become more readily apparent from the following detailed description when taken in conjunction with the illustrated embodiment in the accompany drawings.

BRIEF DESCRIPTION OF THE DRAWINGS

In the accompanying drawings:

FIG. 3 is a table showing data on the position detecting errors of the position detector shown in FIG. 1;

FIG. 4 is a diagram showing one example of an error correcting apparatus in position detection together with a position detector according to the present invention;

FIGS. 5A and 5B are diagrams showing each periodic component (Fourier coefficient) of the Fourier series expansion of a position detecting error in the position detector.

FIG. 6 is a table showing each periodic component of the position detecting error stored in the EEPROM 8 shown in FIG. 4;

FIGS. 9A and 9B are diagrams showing each periodic amplitude and phase component figures out by operating Fourier series expansion on the position detection error detected by the optical type linear encoder shown in FIG. 8;

FIG. 10 is a table showing each periodic component and phase of the position detecting error stored in the EEPROM 8 shown in FIG. 8.

DESCRIPTION OF THE PREFERRED EMBODIMENT

There will be hereinafter made a detailed explanation on the embodiment of the present invention with reference to the accompanying drawings.

Figure 1:
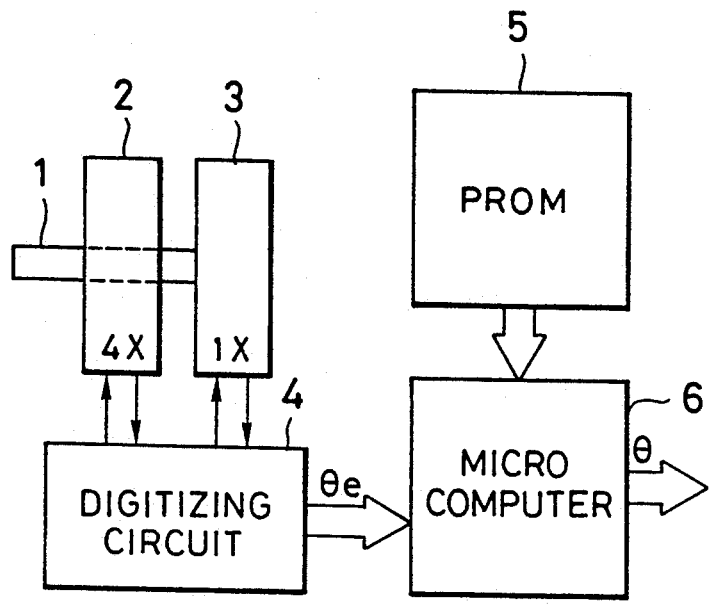
FIG. 1 is a block diagram showing a conventional error correcting apparatus in position detection together with a position detector.

FIG. 4 is a diagram showing one example of an error correcting apparatus in position detection of the present invention together with a position detector which is the same as that of FIG. 1. In FIG. 4, the input shaft 1, the 4×-resolver 2, the 1×-resolver 3 and the digitizing circuit 4 are the same constituents with those of the conventional one, so an explanation thereof is omitted.

Figure 2:
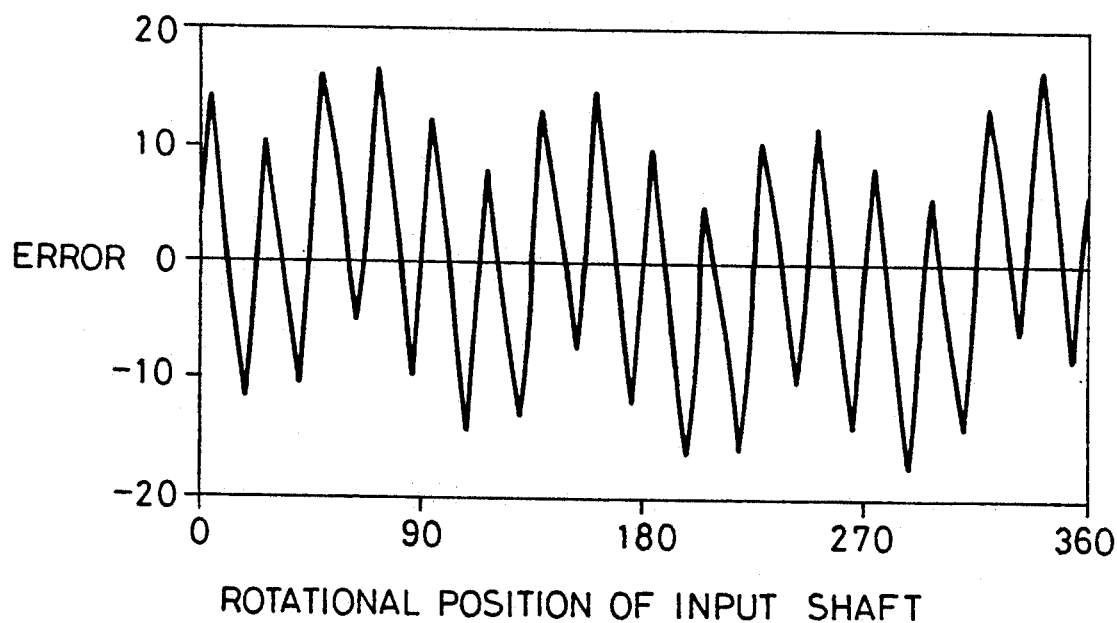
FIG. 2 is a diagram plotting position detecting errors of the position detector shown in FIG. 1.

FIGS. 5A and 5B are diagrams showing respective coefficients in respect of each frequency (= 1/period) of the Fourier cosine series and the Fourier sine series, in the case where the position detecting error shown in FIG. 2 is expanded in a Fourier series using the formula (3) and adopting as the basic period one revolution which is four times the range of the absolute position detection of the 4×-resolver.

$$A[n] = (1/\pi) \int_{-\pi}^{\pi} E[X]\cos[nx]dx$$
$$(n = 1,2\ldots)$$
$$B[n] = (1/\pi) \int_{-\pi}^{\pi} E[X]\sin[nx]dx$$
$$(n = 1,2\ldots)$$
(3)

As is understood from FIGS. 5A and 5B, the position detecting error of the position detector, when expanded in the Fourier series, includes only limited periodic error components. In general, the position detecting error of a resolver of an N-multiplication axial angle (i.e., N×-resolver) is, if one revolution is defined as one period, mostly constituted of components more than the same having $\frac{1}{4}$N to $\frac{3}{4}$N periods, the periodic components having a period less than these are small enough to be neglected. Accordingly, the position detection error in the position detector shown in FIG. 4 can be represented by the 21 data, as is shown in FIG. 6, which has been in advance written in on the EEPROM 8.

Figure 7:
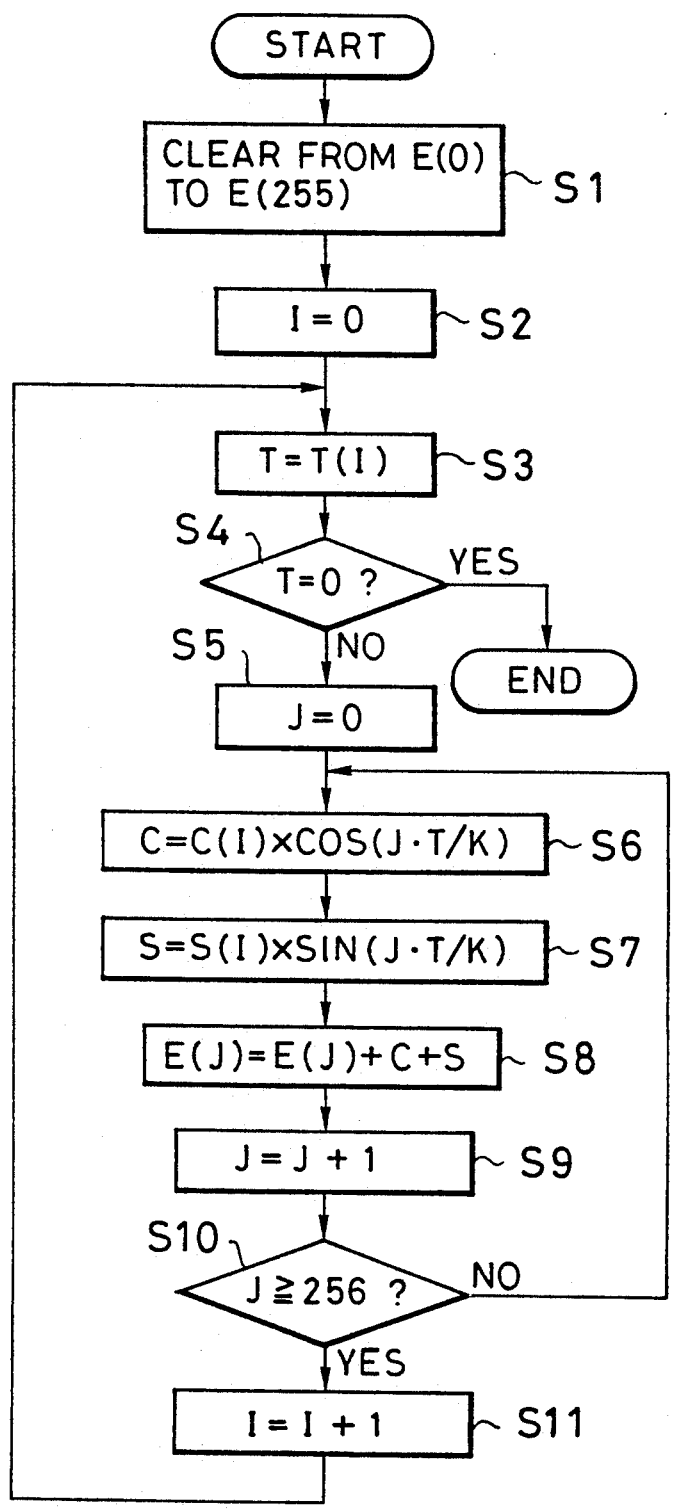
FIG. 7 is a flow chart for explaining the procedures performed by the microcomputer 6 shown in FIG. 4.

The microcomputer 6 reads out the data, in advance, written in on the EEPROM 8 at a time when it is turned on or reset, and subjects the read-out data to inverse Fourier transform to store them in a random access memory (RAM) 7 as correction data. The operation of the microcomputer 6 will be now explained in detail with reference to FIG. 7. Firstly, when the error correcting apparatus in position detection is activated, variables E[0] to E[255] in the random access memory 7 is cleared up to zero (Step S1). A pointer for withdrawing the data from the EEPROM 8 is initialized (Step S2). A period (T[I]) of the position detection error is read out from the EEPROM 8 (Step S3), and if the read-out period T is zero, this process is ended (Step S4). In contrast, if is not zero, next pointer J for writing in data onto the random access memory 7 is initialized (Step S5). Coefficients C[I] and S[I] of respective Fourier cosine series and Fourier sine series are read out, and respectively multiplied by COS[J·T/K] and SIN[J·T/K] (K=2π/256) to define values C and S, and the values C and S are added to a variable E[J] in the random access memory 7 (Steps S6, S7 and S8). The pointer J is added with one (Step S9). The procedures from the Step S6 to the Step S9 are repeated until the pointer J is equal to "256", so as to write in data on position detection error for the single period onto the random access memory 7 (Step S10). When the pointer J becomes equal to "256", the pointer I is increased by "1", the same is performed in respect to the position detection error for the next period (Step S11). By the foregoing process, a set of data on the position detection error can be obtained in the random access memory 7 mostly equivalent to those on the table shown in FIG. 3. Thereafter, the data are subjected to the correction processing in which calculations indicated by the above formulas (1) and (2) are effected, as the same manner with the processing in the conventional error correcting apparatus in position detection shown in FIG. 1.

Figure 8:
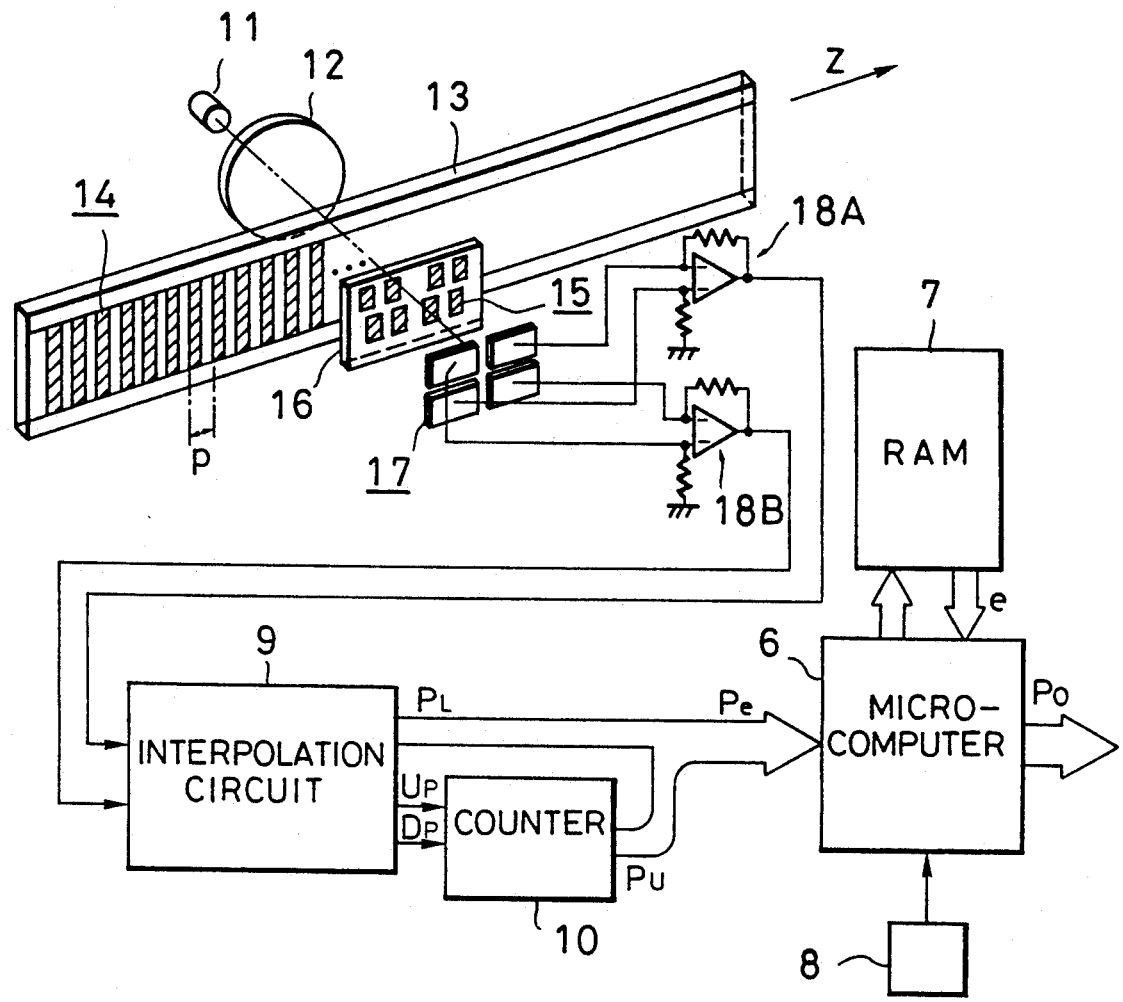
FIG. 8 is a diagram showing one example of the error correcting apparatus in position detection of the present invention together with a linear encoder and a detection circuit.

Next, an explanation will be made on a concrete example adopting, in practice, an error correcting apparatus in position detection of the present invention. FIG. 8 is a diagram showing an optical type linear encoder, a detection circuit for detecting signals thereof and an error correcting apparatus in position detection of the present invention.

In FIG. 8, there is provided a movable member which fixedly holds a main scale 13 (100 mm in length) having first gratings 14 with a pitch P (0.1 mm), while a fixed member (not shown) holds fixedly a slider (not shown) including an index scale 16 having second gratings 15, a light emitting means comprising a light source 11 and a collimator lens 12, and a photoelectric conversion means constituted from a light sensing element 17. In this configuration, the photoelectric conversion means photoelectrically converts the change of light quantity caused by the relative movement between the first gratings 14 and the second gratings 15 to generate a signal. The photoelectrically converted signal is subjected to amplifiers 18A and 18B, an interpolation circuit 9 and a counter 10 in order to convert a variation Z of the relative movement between the main scale 13 and the slider into a digital value. Here, in a position detector as shown in FIG. 8, with respect to the first gratings 14 provided on the mainscale 13, the phase of the second gratings 15 installed on the index scale 16 has been divided into portions, i.e., 0°, 90°, 180°, 270°, when the pitch P of the first gratings 14 is assumed to be 360°. The amplifiers 18A and 18B output, in accordance with the variation Z of the main scale 13, a pair of signals which respectively approximate a sine value SIN(2πZ/P) and a cosine value COS(2πZ/P). The interpolation circuit 9 effects arc tangent operations based on the pair of signals from the amplifiers 18A, and 18B, so as to output a position data $P_L$ which indicates an absolute position within a range of the pitch P (0.1 mm) by numerals "0" to "255". The interpolation circuit 9 carries out a discrimination processing as represented by the conditioning expression (4), in accordance with this, outputs up-count pulses $U_P$, or down-count pulses $D_P$.

When $P_L - P_D < -128$, output the up-count pulses $U_P$
When $P_L - P_D > 128$, output the down-count pulses $D_P$
(4)

(where $P_D$ is defined as $P_L$ detected previously)

The counter 10 outputs the counted number which is counted up or counted down based on the up-count pulses $U_P$ or the down-count pulses $D_P$ sent from the interpolation circuit 9. In other words, the counter 10 outputs the value which indicates how many times the pitch P of the first gratings 14 the shift displacement corresponds to.

The position detection error of the position detector, as described above, is expanded into a Fourier series according to the above formula (3) adopting the basic period as 100[mm] which is a thousand times of 0.1[mm] which is defined as the absolute detection range. Subsequently, each amplitude of various periods is determined according to the following formula (5). Further, based on A[n] and B[n], calculation of arc tangent is effected and phase components are determined in a range of "0" to "2 $\pi$". The results can be obtained as the graphs in FIGS. 9A and 9B.

$$G[n] = \sqrt{A[n] \times A[n] + B[n] \times B[n]} \qquad (5)$$

As will be understood from FIGS. 9A and 9B, the position detection error in the position detector shown in FIG. 8 is to have periodic components each having a period of a quotient obtained by dividing the grating pitch P by an integer. As has been described, in such a position detector, if an error correction in position detection is to be made completely in the range of the whole stroke, an extremely large-scaled memory is required. In addition, in the present condition, the absolute position detection range as is adopted at present is as small as one-thousand of the position detection stroke, so that it is impossible to correct errors in an usual manner.

Figure 11:
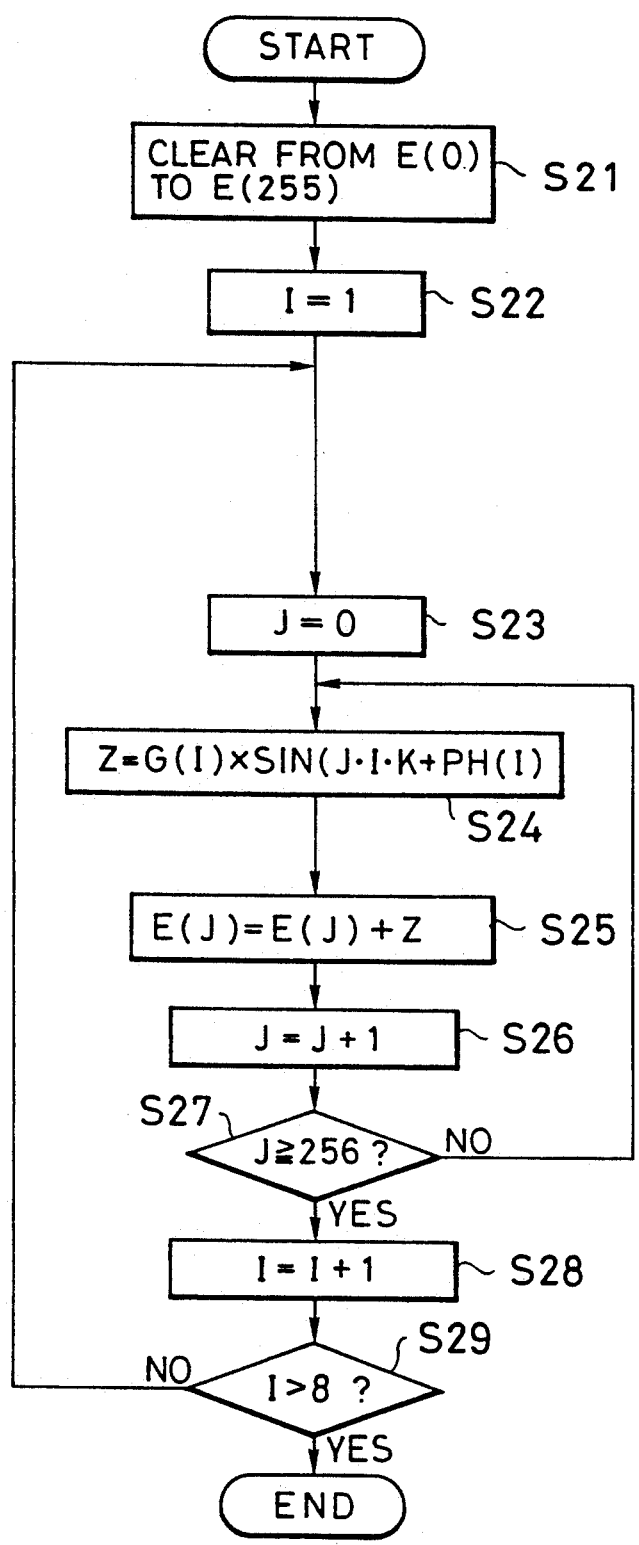
FIG. 11 is a flow chart showing the procedures performed by the microcomputer 6 shown in FIG. 8.

To overcome the above difficulty, in the error correcting apparatus in position detection, there is adapted to be written in, in advance in the EEPROM 8 each amplitude and phase component having a period of a quotient obtained by dividing the absolute position detection range by an integer, as well as belonging to the range is or less than the absolute position detection range (the grating pitch P) as shown in FIG. 10. In this state, the microcomputer 6 reads out, when turned on, each of the periodic components of the position detection errors from the EEPROM 8, converts it into the position detection error and writes the resultant in the random access memory 7. FIG. 11 is a flow chart showing the detailed procedures thereof.

Hereinafter, the explanation will be made with reference to the FIG. 11. The microcomputer 6 clears up the variables E[0] to E[255] in the random access memory 7 to be zero (Step S21). The pointer I for writing the data from the EEPROM 8 is initialized (Step S22). Then the pointer J for writing the data in the random access memory 7 is initialized (Step S23). The microcomputer 6 reads out an amplitude value G[I] and a phase value PH[I] from the EEPROM 8, calculates the value Z to be added to the variable E[J] in the random access memory 7 (Steps S24 and S25). Then, value "1" is added to the pointer J. The procedures from the Step S24 to the Step S26 are to be repeated until the pointer J becomes equal to "256" (Step S27). A data on the position detection error for a single period is written in the random access memory 7. When the pointer J reaches "256", value "1" is added to the pointer I, and the same operation is to be made for the position detection error in respect of the next period (Step S28). These procedures from the Step S23 to the Step S28 are repeated until the pointer I becomes more than "8", thus reproducing in the random access memory 7 the data on the position detection error having a period of not more than the absolute position detection period.

After completion of the above-detailed procedures, the microcomputer 6 computes the following formula (6) using the data on the position detection error in the random access memory 7, thus effecting a correction processing.

$$P_o = P_e - E[PL] \qquad (6)$$

As in the description above, according to the error correcting apparatus in position detection of the present invention, since the amount of data required for the correction can be reduced, it becomes possible to store the data in a small capacity read only memory having a small capacity, whereby making it possible to produce a low cost and small size error correcting apparatus in position detection. In addition, when each periodic component of the position detection errors are stored in a memory in a form of amplitude and phase, since the amplitude values always take positive numbers, even the microcomputer not having the signed multiplication command can easily perform the processing. Further, since the noise component which is made by the measurement do not have periodic property, it can be removed by the filter effect in the Fourier series expansion.

In the foregoing, the present invention has been described in conjunction with the preferred embodiments illustrated in the drawings. It should be however be appreciated that the invention is not restricted to these embodiments. Various modification and variations will readily occur to those skilled in the art without departing from the spirit and scope of the invention.

What is claimed is:

1. An error correcting apparatus in position detection for correcting a position detection error contained in an output position detection value from a position detector, said error correcting apparatus comprising: a non-volatile memory for storing in advance, each Fourier periodic component of said position detection error, which is obtained by transforming said position detection error to Fourier series having basic periods of integer multiplications of an absolute position detection range of said position detector; a converting means for operating, upon activation of said error correcting apparatus, an inverse Fourier transform by reading out each periodic component of said position detection error from said non-volatile memory; a random access memory for storing the position detection error converted by said converting means; and a correcting means for reading out of said random access memory said position detection error corresponding to the output position detection value from said position detector so as to correct said position detection value.

2. An error correcting apparatus as claimed in claim 1, wherein each periodic component of said position detection error is represented in combination of an amplitude and a phase value.

3. An error correcting apparatus as claimed in claim 1, wherein each periodic component of said position detection error is represented in combination of coefficients of Fourier cosine series and Fourier sine series.

* * * * *